Patented Sept. 2, 1952

2,609,398

UNITED STATES PATENT OFFICE 2,609,398

PROCESS FOR HYDROGENATION OF POLYSACCHARIDES

Jan Lolkema, Hoogezand, and Hendrik Adriaan van Westen, Amsterdam, Netherlands, assignors to Naamlooze Vennootschap W. A. Scholten's Chemische Fabrieken, Groningen, Netherlands, a corporation of the Netherlands No Drawing. Application December 22, 1947, Serial No. 793,318. In the Netherlands February 25, 1943

Section 1, Public Law 690, August 8, 1946
Patent expires February 25, 1963

11 Claims. (Cl. 260—635)

The invention relates to a process for the hydrolytic hydrogenation of polysaccharides, especially of starch and starch derivatives, such as dextrin, glucose syrup, commercial glucose sugar and the like, in an aqueous medium with the aid of a catalyst.

It has already been proposed to prepare sorbitol from starch or starch derivatives by hydrolysing the said polysaccharides with an acid and subsequently hydrogenating the product of the hydrolysis.

It has also been proposed to carry out the hydrolysis and the hydrogenation simultaneously while using an ordinary nickel-diatomaceous earth catalyst. This, however, did not produce satisfactory results.

Experiments made by the applicants showed that the said unsatisfactory results were due to the presence of small quantities of alkali in the catalyst originating from the manufacturing process of the catalyst. It is usual, e. g. to prepare a nickel-diatomaceous earth catalyst by precipitating nickel hydroxide from nickel salt solutions on diatomaceous earth with solutions of alkali hydroxide, carbonate or bicarbonate and subsequently reducing the precipitate. Even if the precipitates thus obtained are thoroughly washed with water, they will still contain small proportions of alkaline substances, which apparently are firmly bound to the catalyst. This drawback cannot be removed by neutralizing the alkali with an equivalent quantity of acid; it has even appeared that by the addition of acid the hydrogenating activity of the catalyst will be reduced.

The present invention relates to a process of manufacturing polyhydric alcohols substantially consisting of sorbitol by hydrolytical hydrogenation of polysaccharides, such as starch, high polymeric hydrolysis products of starch, mixtures of starch and glucose and mixtures of high polymeric hydrolysis products of starch and glucose, which comprises heating said polysaccharides in admixture with water in the presence of hydrogen and a hydrogenating catalyst which is substantially free from alkali metal compounds at superatmospheric pressure to a temperature of from 160° to about 200° C.

The expression "mixtures of high polymeric hydrolysis products of starch and glucose" when used in the specification and the appending claims is to be understood also to include products such as glycose syrup and crude starch sugar which are commercial products obtained by hydrolyzing starch and besides glucose contain a substantial proportion of high-polymeric hydrolysis products of starch.

Hydrogenating catalysts substantially free from alkaline substances as used according to the invention may be obtained by precipitating the metal salt solution, preferably a nickel or cobalt salt solution, by means of ammonium hydroxide, carbonate or bicarbonate.

In the further treatment of the precipitate in order to obtain the finished catalyst, which treatment includes a reduction with hydrogen at an elevated temperature, any ammonium compounds remaining after washing will be completely volatilized.

Hydrogenating catalysts substantially free from alkaline substances may also be obtained by precipitating the metal salt solution in the usual way with alkali hydroxide, carbonate or bicarbonate and treating the said precipitate with an ammonium salt, e. g. a solution of ammonium nitrate, whereby the alkali metal is replaced by ammonium. The ammonium compounds formed will volatilize again during the further treatment of the catalyst.

The expression "hydrogenating catalyst substantially free from alkaline substances" when used in the appending claims must be understood to indicate a catalyst in the manufacture of which either the metal salt solution has been precipitated with an ammonium compound or the precipitate obtained with alkali hydroxide, carbonate or bicarbonate, has been subsequently treated with an ammonium compound.

The hydrolytic hydrogenation according to the invention is preferably carried out at temperatures of 160–200° C. At temperatures above 200° all kinds of secondary reactions will occur at first only to a slight degree but later on on a larger scale, i. e. dehydrating and cracking reactions, so that besides sorbitol there will be also formed lower hydric alcohols and alcohols of lower molecular weight. The hydrogen pressures used range from 50 to 200 atmospheres.

When using a starting material consisting of a mixture of glucose and starch or high polymeric hydrolysis products of starch, e. g. glucose syrup or crude starch sugar, it will be advantageous first to transform the glucose into sorbitol by carrying out the hydrogenation at a temperature which is insufficient to cause an appreciable decomposition of the glucose, e. g. a temperature of about 140° C. until at least the bulk of the glucose is reduced, and subsequently to continue the hydrogenating treatment at a temperature from 160–200° C. in order to convert the starch or the high polymeric hydrolysis products of starch into sorbitol.

The use of alkali-free catalysts according to the invention makes it possible also to hydrogenate concentrated starch suspensions which contain not more than 2 parts of water to 1 part of starch or starch derivative in a short time with a very good yield of hexitols without large proportions of catalyst being necessary. In the said concentrated starch suspensions, e. g. a suspension of 1 part of starch in 1 part of water, one will obtain satisfactory results even with 2½% and less of the finely divided metal, calculated on starch or a starch derivative.

The invention will be illustrated by the following examples:

Example I

A catalyst was prepared by dissolving 495 grams of $NiSO_4 \cdot 7H_2O$ in 15 litres of water and adding to the solution 400 grams of purified diatomaceous earth, agitating the solution at a temperature of about 40° C. while adding 6680 grams of a 5% ammonium bicarbonate solution, thereafter stirring the liquid for about 1½ hours at a temperature of 40° C., allowing the precipitate to settle, decanting the liquid, boiling the precipitate with 15 litres of water and centrifuging and washing the same with hot water until the washing water did not contain a trace of sulphate. The product thus obtained was dried at 110° C. and reduced in hydrogen gas at a temperature of 525° C.

A mixture of 125 grams of starch and 125 grams of water was heated for 75 minutes to a temperature of 200° C. in an autoclave in the presence of 12.5 grams of the above mentioned catalyst under a hydrogen pressure of 120 atmospheres.

The reaction product contained 97% of sorbitol and only 1.4% of dextrin.

When using a catalyst precipitated with sodium hydroxide, instead of ammonium bicarbonate, one obtained under otherwise similar conditions a product containing only 15% of sorbitol but 80% of dextrin.

Example II

A solution of 125 grams of commercial glucose sugar containing 13.3% of dextrin, calculated on the dry material, in 125 grams of water was heated for 90 minutes at a temperature of 140° C. with 12.5 grams of the catalyst, obtained according to Example I by precipitation with ammonium bicarbonate, under a hydrogen pressure of about 100 atmospheres, in order to convert the glucose present in the solution into sorbitol, and subsequently subjected to a hydrolytic hydrogenation at 200° C. for about 75 minutes. The product obtained contained 97% of sorbitol and 0.5% of dextrin.

When using in the same process a catalyst obtained by precipitation with sodium hydroxide the product obtained contained 90% of sorbitol and 7% of dextrin.

We claim:

1. A process of manufacturing polyhydric alcohols substantially consisting of sorbitol by the hydrolytic hydrogenation of polysaccharides selected from the group consisting of starch, high polymeric hydrolysis products of starch, mixtures of starch and glucose and mixtures of high polymeric hydrolysis products of starch and glucose, which comprises adding a hydrogenating catalyst, substantially free from alkali metal compounds, to a mixture of said polysaccharides and water and heating said mixture in the presence of hydrogen at superatmospheric pressure to a temperature above 160° C. but not exceeding about 200° C.

2. A process of manufacturing polyhydric alcohols substantially consisting of sorbitol by the hydrolytic hydrogenation of polysaccharides selected from the group consisting of starch, high polymeric hydrolysis products of starch, mixtures of starch and glucose and mixtures of high polymeric hydrolysis products of starch and glucose, which comprises adding a nickel catalyst, substantially free from alkali metal compounds, to a mixture of said polysaccharides and water and heating said mixture in the presence of hydrogen at superatmospheric pressure to a temperature above 160° C. but not exceeding about 200° C.

3. A process of manufacturing polyhydric alcohols substantially consisting of sorbitol by the hydrolytic hydrogenation of polysaccharides selected from the group consisting of starch, high polymeric hydrolysis products of starch, mixtures of starch and glucose and mixtures of high polymeric hydrolysis products of starch and glucose, which comprises adding a cobalt catalyst, substantially free from alkali metal compounds, to a mixture of said polysaccharides and water and heating said mixture in the presence of hydrogen at superatmospheric pressure to a temperature above 160° C. but not exceeding about 200° C.

4. A process of manufacturing polyhydric alcohols substantially consisting of sorbitol by the hydrolytic hydrogenation of polysaccharides selected from the group consisting of starch, high polymeric hydrolysis products of starch, mixtures of starch and glucose and mixtures of high polymeric hydrolysis products of starch and glucose, which comprises adding not more than 1 part by weight of a hydrogenating catalyst, substantially free from alkali metal compounds, to a mixture of 40 parts by weight of said polysaccharide with not more than 80 parts by weight of water and heating said mixture in the presence of hydrogen at superatmospheric pressure to a temperature above 160° C. but not exceeding about 200° C.

5. A process of manufacturing polyhydric alcohols substantially consisting of sorbitol by the hydrolytic hydrogenation of starch which comprises adding a hydrogenating catalyst, substantially free from alkali metal compounds, to a mixture of starch and water and heating said mixture in the presence of hydrogen at superatmospheric pressure to a temperature of about 200° C.

6. A process of manufacturing polyhydric alcohols substantially consisting of sorbitol by the hydrolytic hydrogenation of high polymeric hydrolysis products of starch, which comprises adding a hydrogenating catalyst, substantially free from alkali metal compounds, to a mixture of said material and water and heating said mixture in the presence of hydrogen at superatmospheric pressure to a temperature of about 200° C.

7. A process of manufacturing polyhydric alcohols substantially consisting of sorbitol by the hydrolytic hydrogenation of dextrine, which comprises adding a hydrogenating catalyst substantially free from alkali metal compounds to a mixture of dextrin and water and heating said mixture in the presence of hydrogen at superatmospheric pressure to a temperature of about 200° C.

8. A process of manufacturing polyhydric alcohols substantially consisting of sorbitol by the hydrolytic hydrogenation of a mixture of starch and glucose, which comprises adding a hydrogenating catalyst, substantially free from alkali metal compounds, to a mixture of said materials and water, heating said mixture in the presence of hydrogen at superatmospheric pressure to a temperature of about 140° C., until at least the bulk of the glucose is converted into sorbitol, and subsequently reducing the starch to sorbitol by continuing the hydrogenating treatment at a temperature above 160° C., but not exceeding about 200° C.

9. A process of manufacturing polyhydric alcohols substantially consisting of sorbitol by the hydrolytic hydrogenation of a mixture of high polymeric hydrolysis products of starch and glucose, which comprises adding a hydrogenating catalyst, substantially free from alkali metal compounds to a mixture of said materials and water, heating said mixture in the presence of hydrogen at superatmospheric pressure to a temperature of about 140° C., until at least the bulk of the glucose is converted into sorbitol, and subsequently reducing the high polymeric hydrolysis products of starch to sorbitol by continuing the hydrogenating treatment at a temperature above 160° C., but not exceeding about 200° C.

10. A process of manufacturing polyhydric alcohols substantially consisting of sorbitol by the hydrolytic hydrogenation of glucose syrup, which comprises adding a hydrogenating catalyst, substantially free from alkali metal compounds, to a mixture of said material and water, heating said mixture in the presence of hydrogen at superatmospheric pressure to a temperature of about 140° C., until at least the bulk of the glucose is converted into sorbitol, and subsequently continuing the hydrogenating treatment at a temperature above 150° C., but not exceeding about 200° C.

11. A process of manufacturing polyhydric alcohols substantially consisting of sorbitol by the hydrolytic hydrogenation of crude starch sugar containing about 13% of dextrin, which comprises adding a hydrogenating catalyst, substantially free from alkali metal compounds, to a mixture of said material and water, heating said mixture in the presence of hydrogen at superatmospheric pressure to a temperature of about 140° C., until at least the bulk of the glucose is converted into sorbitol, and subsequently continuing the hydrogenating treatment at a temperature above 160° C., but not exceeding about 200° C.

JAN LOLKEMA.
HENDRIK ADRIAAN van WESTEN.

REFERENCES CITED

The following references are of record in the file of this patent:

UNITED STATES PATENTS

| Number | Name | Date |
|---|---|---|
| 2,280,975 | Power | Apr. 28, 1942 |
| 2,292,293 | Rose | Aug. 4, 1942 |